United States Patent [19]

Watari et al.

[11] Patent Number: 5,063,550
[45] Date of Patent: Nov. 5, 1991

[54] LOOP-GAIN CONTROL SYSTEM IN A SPINDLE SERVO LOOP

[75] Inventors: Haruo Watari; Sigeru Yasuda, both of Saitama, Japan

[73] Assignee: Pioneer Electronic Corporation, Tokyo, Japan

[21] Appl. No.: 417,161

[22] Filed: Oct. 4, 1989

[30] Foreign Application Priority Data

Oct. 12, 1988 [JP] Japan .................. 63-256431

[51] Int. Cl.$^5$ ................................. G11B 7/00
[52] U.S. Cl. ............................ 369/44.36; 360/73.03; 358/322; 358/342
[58] Field of Search .................. 358/342, 311; 369/50, 369/44.25, 44.26, 44.28, 43, 32, 33, 44.29, 44.35, 47, 44.36; 360/10.1, 9.1, 73.03, 72.2, 73.04

[56] References Cited

U.S. PATENT DOCUMENTS

| | | | |
|---|---|---|---|
| 4,710,827 | 12/1987 | Okita | 369/50 |
| 4,866,695 | 9/1989 | Suzuki et al. | 369/266 |
| 4,908,810 | 3/1990 | Oie | 369/32 |
| 4,979,048 | 12/1990 | Shimada et al. | 358/342 |

FOREIGN PATENT DOCUMENTS

| | | |
|---|---|---|
| 178657 | 4/1986 | European Pat. Off. . |
| 202480 | 11/1986 | European Pat. Off. . |
| 272076 | 6/1988 | European Pat. Off. . |
| 123946 | 7/1988 | European Pat. Off. . |
| 3140827 | 6/1982 | Fed. Rep. of Germany . |
| 1549439 | 8/1979 | United Kingdom . |

*Primary Examiner*—Roy N. Envall, Jr.
*Assistant Examiner*—Thai Tran
*Attorney, Agent, or Firm*—Sughrue, Mion, Zinn Macpeak & Seas

[57] ABSTRACT

A servo control loop for a disc player initially sets an offset value, which is used throughout search and playback to control the gain of an equalizer in the servo loop. The offset value is determined by first moving a pickup head to radially central position of the disc and reading the time code address data recorded at that position. The read address is compared with a calculated, expected address to determine if the two are within a given distance. If they are, the offset is set as a predetermined value, e.g., zero. If they are not within a given distance, the offset is determined one of two ways. Either the difference is used as the offset, or the pickup head is moved to the innermost circumference of the data portion of the disc and the address data read therefrom is used as the offset. During search and playback the offset is subtracted from the continuously read address data, and the difference controls the gain of the equalizer.

5 Claims, 4 Drawing Sheets

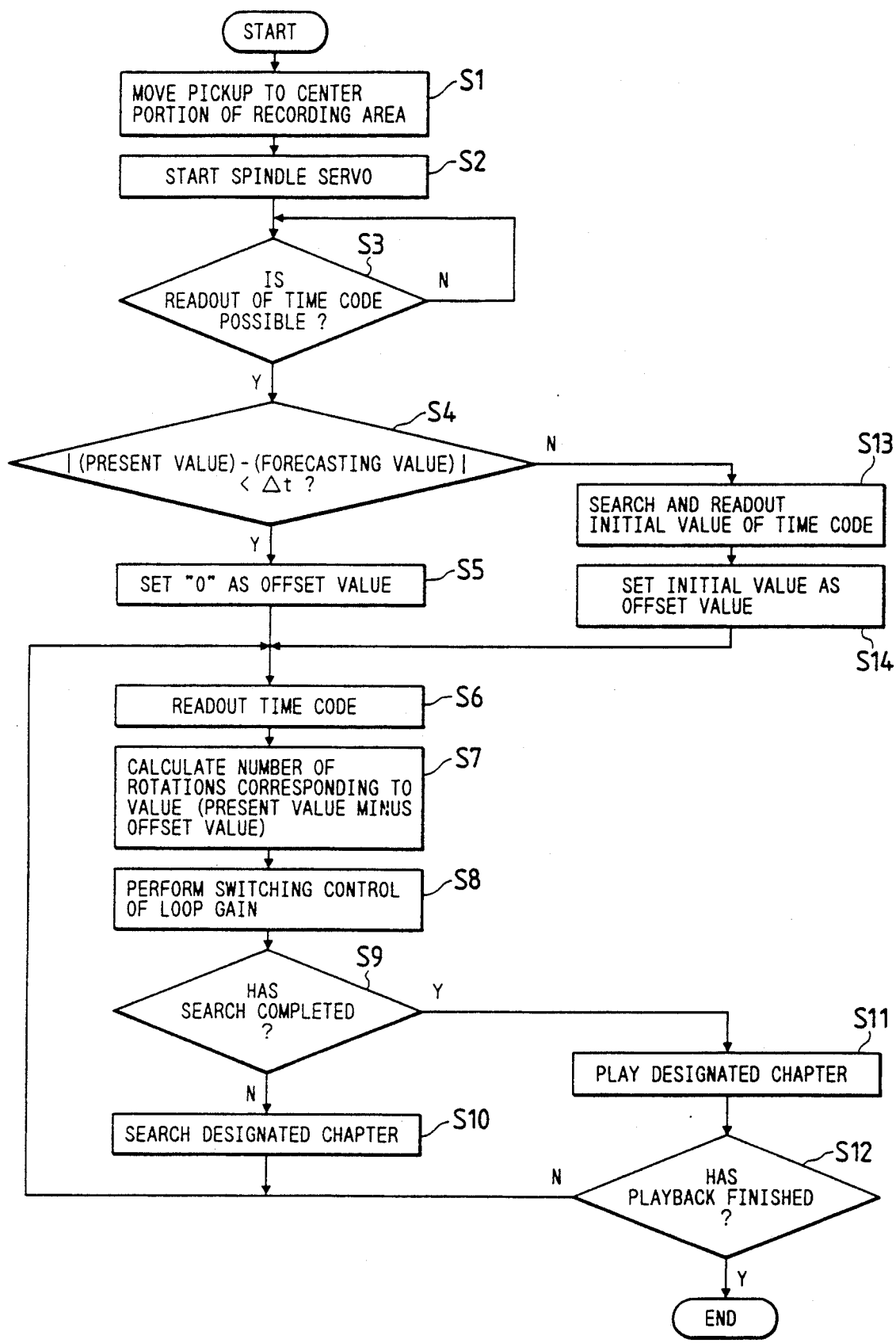

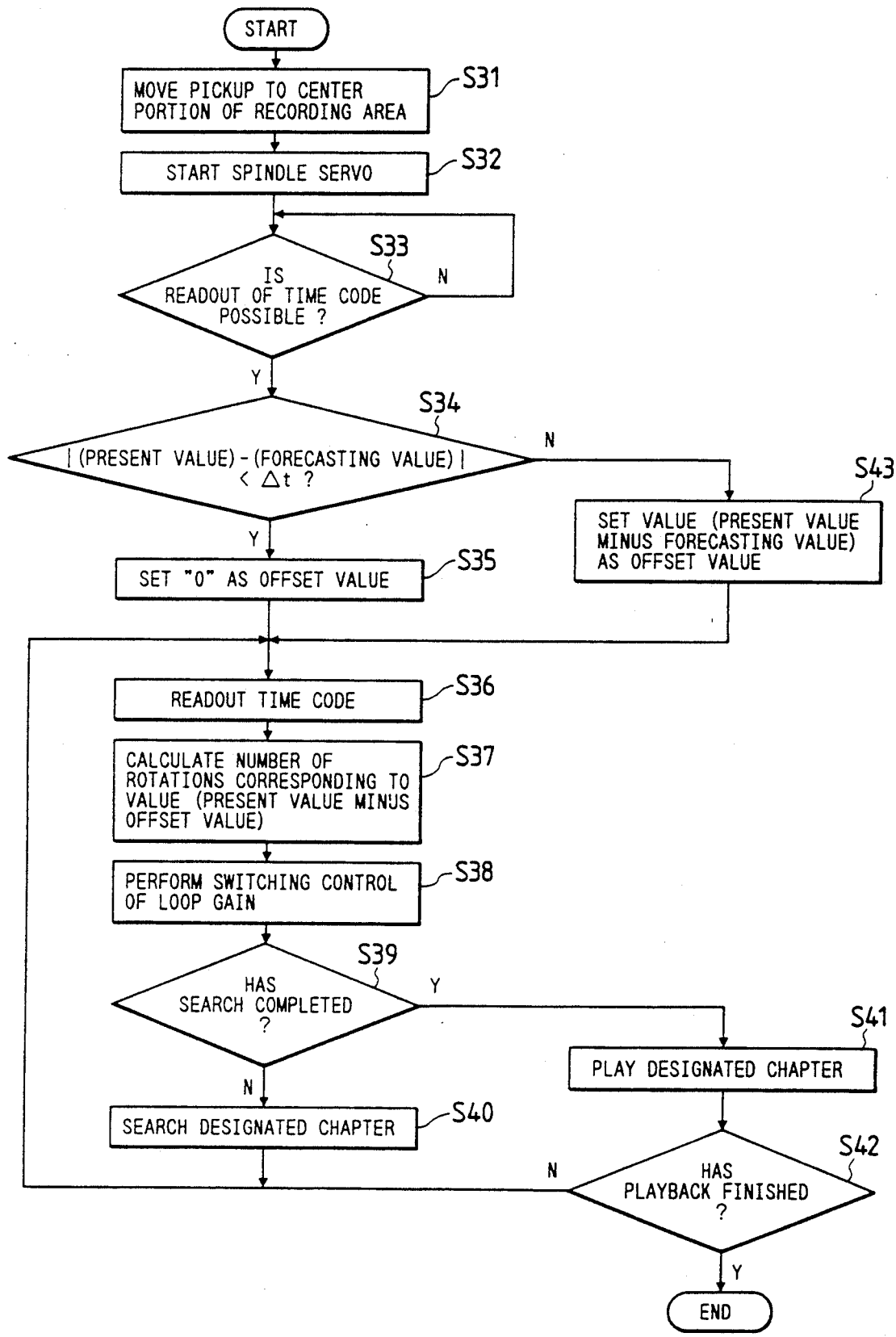

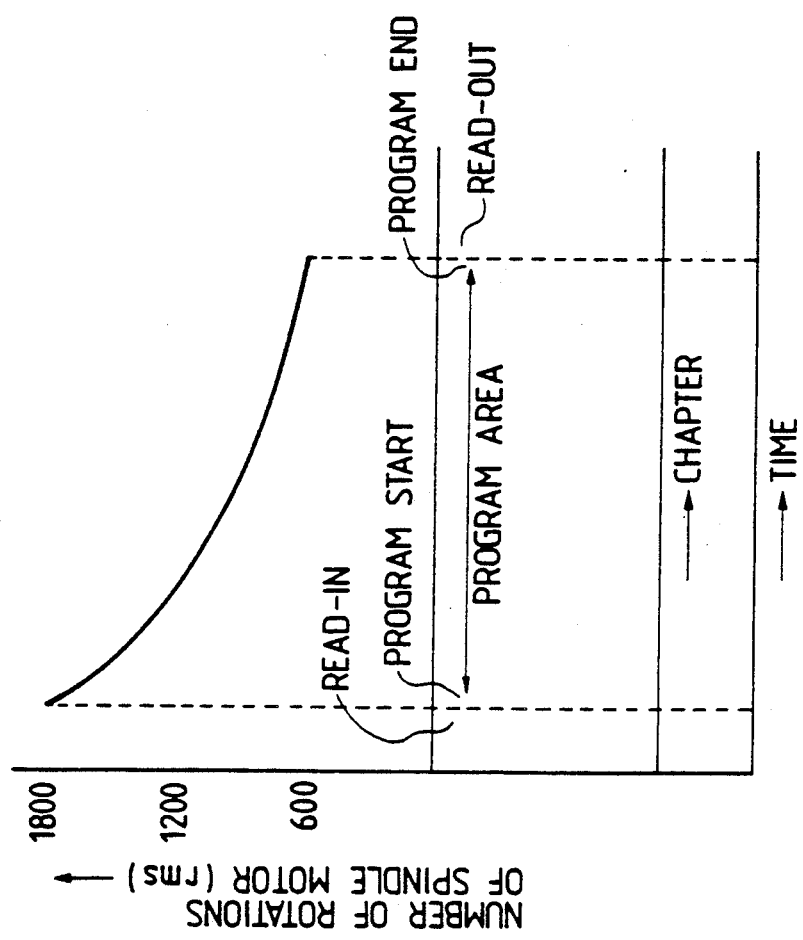

LOOP-GAIN CONTROL SYSTEM IN A SPINDLE SERVO LOOP

BACKGROUND OF THE INVENTION

The present invention relates to a loop-gain control system in spindle servo loop for controlling the rotating speed of a disc and particularly relates to a loop-gain control system in a spindle servo loop for playing a so-called CLV disc.

A CLV disc is a disc on which recording has been made so that the linear speed is constant in playback, and the defined rotating speed of the disc changes correspondingly to the relative position of the pickup in the radial direction of the disc as shown in FIG. 4. In the case where playback starts from a desired section or chapter on a CLV disc even if the spindle servo for controlling the rotating speed of the disc locks-in once, it still takes time for the spindle servo to lock-in again after the pickup has been moved to the desired chapter resulting in a problem that it takes a long time before starting playback. Therefore, it has been proposed to turn on the spindle servo after the pickup has been moved to a center portion of a recording area. In such case, since the lock-in of the spindle servo can be obtained at a lower rotating speed than that in the innermost circumference, the time taken for lock-in can be shortened, and since the distance to a desired chapter is shortened because of averaging the time taken for movement of the pickup is shortened, so that the time required before starting playback can be shortened.

Such a conventional disc player has used a system in which a time code read by the pickup constitutes address data indicating the recording position, the relative position of the pickup in the radial direction of the disc is detected, and the defined rotating speed of the disc is calculated so that control of the loop gain of the spindle servo can be performed in accordance with the rotating speed of the disc on the basis of the calculated value of the defined rotating speed.

In such a conventional system however, there has been a disadvantage if the time code recorded on the CLV disc does not start from 0 seconds. An error may occur in the calculation of the defined rotating speed so as to make the loop gain control of the spindle servo erroneous thereby making it impossible to perform a search or the like.

In order to eliminate this problem, it has been proposed to provide a potentiometer on a slider for mounting the pickup thereby producing a position detection signal corresponding to a relative position of the pickup in the radial direction of a disc. The obtained position detection signal performs the control function for switching the loop gain of the spindle servo. In this method, however the number of adjustment steps increases as the number of parts increases so that the production costs rise and reliability suffers.

SUMMARY OF THE INVENTION

An object of the present invention is to provide a loop-gain control system in a spindle servo loop in which the loop gain of a spindle servo loop can be controlled preferably without increased production costs or lowered reliability.

The foregoing object of the present invention is attained by a loop-gain control system in which the pickup is moved to a predetermined start point on the disc, the spindle servo is turned on, and the present address is read from the disc the present address is compared with a forecasted address for said predetermined start point to determine if they differ by more or less than a predetermined distance; if the difference is within said predetermined distance a first predetermined address is set as the start offset data if the difference is outside said predetermined distance, either the difference address or the initial value of the address data in the disc is set as the start offset data: and, during the operation of search and playback of the disc player, the loop-gain of the spindle servo loop is changed in accordance with the difference between the currently read address on the disc and the offset value.

BRIEF DESCRIPTION OF THE DRAWINGS

FIGS. 2 and 3 are flow charts illustrating the operation of a processor in the apparatus of FIG. 1; and FIG. 4 is a graph illustrating the relationship between the leading position and the defined rotating speed of a CLV disc.

DETAILED DESCRIPTION OF A PREFERRED EMBODIMENT

Figure 1:
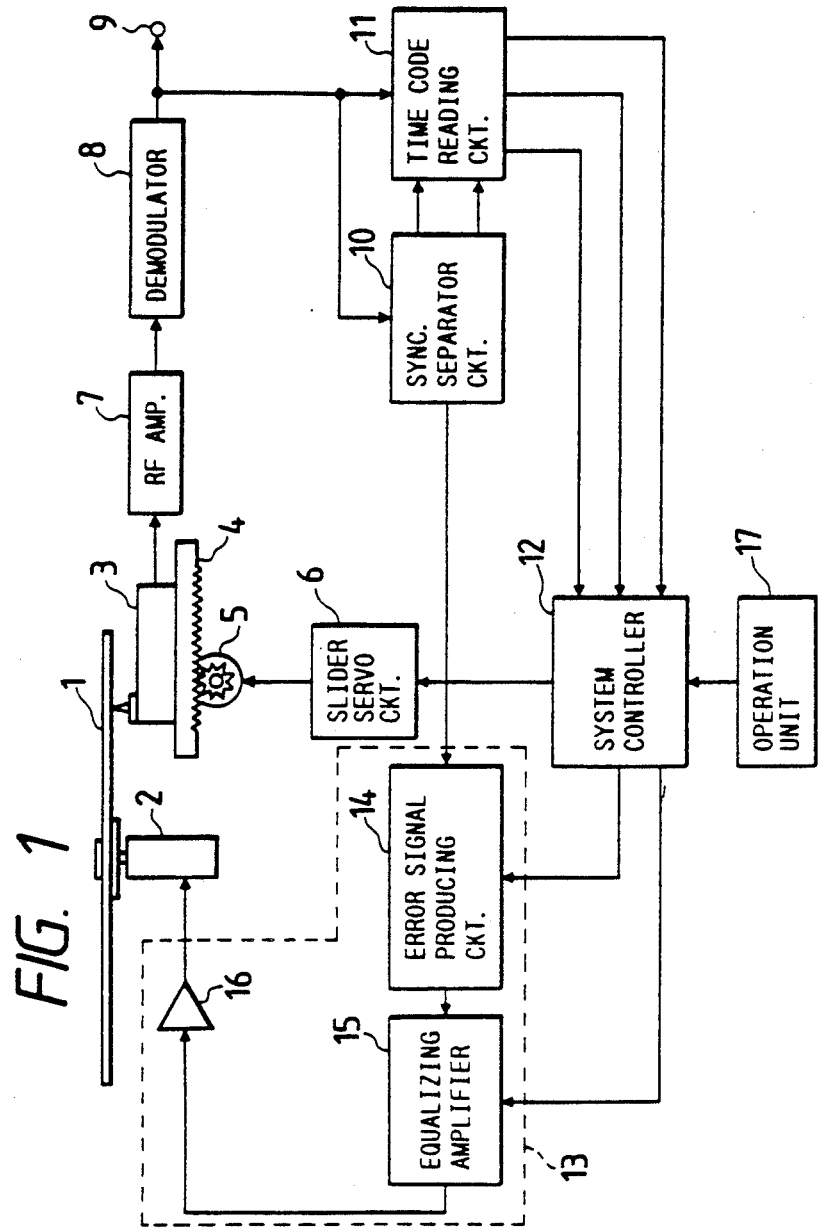
FIG. 1 is a block diagram illustrating an embodiment of the present invention.

An embodiment of the present invention will be described in detail with reference to the accompanying drawings.

In FIG. 1, a disc 1 has an FM-modulated video signal recorded thereon, and in the video signal a Philips code including a time code as address data indicating a recording position is inserted at a portion corresponding to a predetermined line. The disc 1 is driven to rotate by a spindle motor 2. The signal recorded on the disc 1 is read out by a pickup 3 with the rotation of the disc 1.

The pickup 3 is mounted on a slider 4 supported movably in the radial direction of the disc 1. The relative position of the pickup 3 in the radial direction of the disc 1 is controlled by a slider servo circuit 6 for controlling a slider motor 5 for driving the slider 4.

The read output of the pickup 3 is supplied through an RF amplifier 7 to a demodulator 8 constituted by an FM demodulator and the like, for reproducing the recorded video signal. The reproduced video signal from the demodulator 8 is supplied to a video output terminal 9, a synchronizing separator circuit 10, and a time code reading circuit 11. Horizontal and vertical synchronizing signals are separated from the reproduced video signal by the synchronizing separator circuit 10 and are supplied to the time code reading circuit 11. The time code reading circuit 11 reads a Philips code inserted in the reproduced video signal at a position corresponding to a predetermined line on the basis of the supplied horizontal and vertical synchronizing signals and if the Philips code has been read out, the time code reading circuit 11 outputs a readability signal and holds the time code data as address data and chapter number data indicating the chapter number included in the Philips code. The readability signal, the time code data and the chapter number data from the time code reading circuit 11 are supplied to a system controller 12.

The horizontal synchronizing signal from the synchronizing separator circuit 10 is also supplied to a spindle servo circuit 13. In the spindle servo circuit 13 the horizontal synchronizing signal is fed to an error signal producing circuit 14. The error signal producing circuit 14 is arranged to produce an error signal corresponding to the phase difference between the horizontal synchronizing signal and a reference signal of a predetermined frequency in response to an on-command signal. The error signal produced by the error signal producing circuit 14 is amplified and phase-compensated by an equalizing amplifier 15 and supplied as a driving signal to the spindle motor 2 through a driving amplifier 16. The equalizing amplifier 15 is arranged so that the gain thereof is changed in accordance with the output data of the system controller 12.

Various commands corresponding to key operations are also supplied to the system controller 12 from an operation unit 17. The system controller 12 is formed of a microcomputer constituted by a processor, a ROM a RAM and the like and the processor, which operates with a program stored in the ROM in advance supplies various commands to the slider servo circuit 6 the spindle servo circuit 13 and so on in accordance with the outputs of the time code reading circuit 11 and the operation unit 17.

The operation of the processor in the system controller 12 having the above-mentioned configuration will be described in detail with reference to the flow chart in FIG. 2.

When a play-start command and data designating a chapter to be played are supplied from the operation unit 17 in executing a main routine or the like the processor shifts to a step S1 in which, for example, the processor supplies a driving signal to the slider servo circuit 6 for a predetermined period so as to move the slider 4 by a predetermined distance toward the inner circumference to thereby move the pickup 3 to a center portion of the recording area of disc 1. It is assumed that the slider 4 is disposed in the innermost circumferential position by the main routine immediately before the processor shifts to the step S1.

Next, the processor supplies an on-command signal to the error signal producing circuit 14 to start the control of rotation of the spindle motor 2 (a step S2). and judges whether a time code has been read out or not on the basis of a readability signal produced from the time code reading circuit 11 (a step S3). When it is determined in the step S3 that the time code has been read out, the processor subtracts a forecasting value, corresponding to the center portion of the recording area of the disc 1 from the present value, represented by the time code from circuit 11, and determines whether the absolute . value of the difference $X_t$ is smaller than a predetermined value $\Delta t$ (step S4).

When it is determined in step S4 that $|X_t|$ is smaller than the predetermined value $\Delta t$, the processor stores "0" as a start time offset value in a predetermined address of the RAM (step S5) and reads the output data of the time code reading circuit 11 again (step S6). Next, the processor subtracts the start time offset value from the data retained in step 6 to provide a value indicating the relative position of pickup 3 in the radial direction of the disc, and calculates a defined rotating speed corresponding to the value on the basis of a ROM table or the like (step S7). Next, the processor supplies data corresponding to the value calculated in step S7 to the equalizing amplifier 15 to thereby perform switching control of the gain of the equalizing amplifier 15 (step S8) and judges on the basis of the chapter number data from the time code reading circuit 11 obtained in the step S6, whether the pickup 3 has reached a track having the designated chapter recorded thereon (step S9).

When it is determined in step S9 that the pickup 3 has not reached a track having the designated chapter recorded thereon, the processor supplies a driving command signal to the slider servo circuit 6 so as to move the pickup 3 toward the designated track (step S10). and shifts to the step S6 again. When it is determined in step S9 that the pickup 3 has reached the designated track, the processor initiates a playback operation (step S11). and determines whether the playing of the designated chapter has finished or not (step S12). When it is determined in step S12 that the playing of the designated chapter has not finished the processor shifts to step S6 again. If it is determined that the playing of the designated chapter has finished, the processor reopens the execution of the routine which was being executed immediately before the processor shifted to the step 1.

When it is determined in step 4 that the absolute value of $X_t$ is not smaller than the predetermined value $\Delta t$, the processor searches for the start position of a chapter in the innermost circumference of the disc (step S13), reads the output data of the time code reading circuit 11 as a start time offset value in a predetermined address of the RAM (step S14). and shifts to step S6.

As a result of the above-mentioned steps S4, S5, S13 and S14 the offset value will be determined. A "0" will be set as the start time offset value for discs in which the time codes start from 0 seconds, because the absolute value of the difference between a value of a time code obtained in a center portion of a recording area and a forecasting value will be small. On the other hand the initial value of the time code will be set as the start time offset value in a disc in which the time codes do not start from 0 seconds, because in this case, the absolute value of the difference between the value of the time code-obtained at the center portion of the recording area and the forecasting value is large. Since this start time offset value is subtracted from the time code read out later a correct value corresponding to the relative position of the pickup in the radial direction of the disc is obtained irrespective of the initial value of the time code, and the defined rotating speed of the disc is calculated without error. Since the loop gain of a spindle servo loop is subject to switching control in accordance with this defined rotating speed of the disc calculated with no error, it is possible to perform a preferable control of the loop gain of the spindle servo loop.

FIG. 3 is a flow chart illustrating another example of the operation of the processor in the system controller 12 in which the operations in steps S31 to S42 are similar to those in the steps S1 to S12 in the flow chart in FIG. 2, respectively. However, when it is determined in step 34 in this example that the absolute value $X_t$ is not smaller than the predetermined value $\Delta t$, the processor stores the value $X_t$ as the start time offset value at a predetermined address in the RAM (step S43), and shifts to the step S36.

In the above-mentioned operation since the value $X_t$ is substantially equal to an initial value of a time code the same operation as that in the flow chart in FIG. 2 is carried out.

As has been described above, the loop-gain control system in a spindle servo loop according to the present invention operates as follows:

the pickup is moved to a predetermined start point on the disc the spindle servo is turned on, and the present address is read from the disc; the present address is compared with a forecasted address for said predetermined start point to determine if they differ by more or less than a predetermined distance; if the difference is within said predetermined distance a first predetermined address is set as the start offset data if the difference is outside said predetermined distance, either the difference address or the initial value of the address data in the disc is set as the start offset data; during the operation of search and playback if the disc player the loop-gain of the spindle servo loop is changed in accordance with the difference between the currently read address on the disc and the offset value.

Accordingly, it is possible to obtain a value corresponding to a relative position of the pickup in the radial direction of the disc that is a value corresponding to the defined rotating speed of the disc without using any potentiometer or the like, no In the loop-gain control system in a spindle servo loop according to the present invention, therefore, is possible to preferably control a loop gain of a spindle servo loop without the problem of increased production cost and reduced reliability.

What is claimed is:

1. In a spindle servo loop of disc playback system for playing back discs having recorded thereon time codes representing addresses, said system and said loop being of the type having a pickup head for reading data from said disc, pickup head moving means for moving said pickup head radially of said disc, address means for developing an address corresponding to said data read by said pickup head, processor means responsive to input control signals and address signals for controlling movement of said pickup head and for providing gain control signals to control gain of an equalizer in said spindle servo loop to control the gain of amplification of a loop error signal, the improvement comprising, under control of said processor, the steps of:

(a) moving said pickup head radially to a predetermined start position of said disc and turning on said spindle servo and reading a predetermined start position address from said disc;

(b) comparing said predetermined start position address with a calculated value representing an expected start position address to determine if said addresses differ by a predetermined distance by determining a difference between said address;

(c) setting as a start offset value a predetermined value if said difference is within said predetermined distance, and setting as a start offset value said difference if said difference is outside said predetermined distance; and (d) controlling said spindle servo loop during search and playback operations and the gain of said equalizer in accordance with a second difference produced by subtracting said start offset value produced by said setting step from continuously read address data from said disc.

2. In a spindle servo loop of disc playback system for playing back discs having recorded thereon time codes representing addresses, said system and said loop being of the type having a pickup head for reading data from said disc, pickup head moving means for moving said pickup head radially of said disc, address means for developing an address corresponding to said data read by said pickup head, processor means responsive to input control signals and address signals for controlling movement of said pickup head and for providing gain control signals to control gain of an equalizer in said spindle servo loop to control the gain of amplification of a loop error signal, the improvement comprising, under control of said processor, the steps of:

(a) moving said pickup head radially to a predetermined start position of said disc and turning on said spindle servo and reading a predetermined start position address from said disc;

(b) comparing said predetermined start position address with a calculated value representing an expected start position address to determine a difference between said addresses so as to determine if said addresses differ by a predetermined distance;

(c) setting as a start offset value a predetermined value if said difference is within said predetermined distance, and setting as a start offset value an initial address read from an innermost circumference of a portion of said disc containing said data if said difference is outside said predetermined distance; and (d) controlling said spindle servo loop during search and playback operations by controlling the gain of said equalizer in accordance with a second difference produced by subtracting said start offset value provided by said setting step from continuously read address data from said disc.

3. The invention of claim 2 wherein the step of setting as a start offset value an initial address, comprises, moving said pickup head to the innermost circumferential data portion of said disc and reading the address data recorded there.

4. The invention of any of claims 1-3, wherein said predetermined value is zero.

5. The invention of any of claims 1-3, wherein said predetermined start position is a position on said disc that is radially centered between the innermost and outermost circumferential portions of said data portion of said disc.

* * * * *